United States Patent
Gschwind (10) Patent No.: US 7,475,224 B2
(45) Date of Patent: Jan. 6, 2009

(54) REGISTER MAP UNIT SUPPORTING MAPPING OF MULTIPLE REGISTER SPECIFIER CLASSES

(75) Inventor: Michael Karl Gschwind, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 11/619,248

(22) Filed: Jan. 3, 2007

(65) Prior Publication Data

US 2008/0162898 A1 Jul. 3, 2008

(51) Int. Cl.
G06F 12/10 (2006.01)
(52) U.S. Cl. ..................... 712/217; 712/228
(58) Field of Classification Search ............... 712/217, 712/228
See application file for complete search history.

(56) References Cited

U.S. PATENT DOCUMENTS

| | | | |
|---|---|---|---|
| 5,613,132 A | | 3/1997 | Clift et al. |
| 5,644,742 A | * | 7/1997 | Shen et al. .................. 712/244 |
| 5,881,305 A | * | 3/1999 | Walker ........................ 712/23 |
| 5,961,636 A | | 10/1999 | Brooks et al. |
| 6,240,507 B1 | | 5/2001 | Derrick et al. |
| 6,279,102 B1 | * | 8/2001 | Morrison ..................... 712/216 |
| 6,324,640 B1 | * | 11/2001 | Le et al. ...................... 712/217 |
| 6,393,546 B1 | | 5/2002 | Witt et al. |
| 6,625,723 B1 | | 9/2003 | Jourday et al. |
| 6,629,236 B1 | * | 9/2003 | Aipperspach et al. ....... 712/228 |
| 6,944,751 B2 | | 9/2005 | Fetzer et al. |

OTHER PUBLICATIONS

Lipasti et al., "Physical Register Inlining", Proceedings of the 31st Annual International Symposium on Computer Architecture, IEEE, Jun. 19-23, 2004, pp. 325-335.*
T.N. Buti, et al. "Organization and implementation of the register-renaming mapper for out-of-order IBM Power4 processors". IBM Journal of R&D, vol. 49, No. 1, p. 167 (2005).
Michael Karl Gschwind, "The official corporate bio for Dr. Gshwind is hosted by the IBM Research Communications team." http://www.research.ibm.com/people/m/mikeg/ Feb. 8, 2007.

* cited by examiner

*Primary Examiner*—William M Treat
(74) *Attorney, Agent, or Firm*—Cantor Colburn LLP; Lisa M. Yamonaco (57) ABSTRACT

Embodiments of this invention relate to sharing resources on a semiconductor between multiple functional units to reduce the number of register rename mappers and particularly to providing a way to share a CAM mapper between two distinct physical register files. In one embodiment the physical register files correspond to architectural function units. In another embodiment the physical registers correspond to thread clusters.

7 Claims, 8 Drawing Sheets

PRIOR ART

REGISTER MAP UNIT SUPPORTING MAPPING OF MULTIPLE REGISTER SPECIFIER CLASSES

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to sharing resources on a semiconductor between multiple functional units to reduce the area consumed by register renaming logic and particularly to providing a way to share a CAM mapper between two distinct physical register files.

2. Description of Background

Before our invention, to increase the performance leverage of present-day superscalar-pipelined microprocessors beyond technology scaling, one needs to maximize the concurrency and overlap in instruction processing. Microarchitectural techniques for instruction-level parallelism can be used to achieve increased concurrency in instruction processing. Out-of-order execution and speculative execution are two powerful techniques that are exploited in modern high-performance processors to increase the amount of concurrency. If the operand data is ready and the required execution resources are free, more concurrency in the pipeline and more performance can be achieved by allowing instructions to be executed out of order. However, while the instructions are processed out of order, they are forced to be committed in program order, which preserves the succession in the architectural states of the machine.

In speculative execution, predictions are made about instructions after branches and are allowed to be speculatively processed in parallel with other instructions. This also increases concurrency and improves performance. If the prediction was false, the speculatively executed instructions are flushed and not committed.

However, to apply these microarchitectural techniques, one has to overcome the instruction data-dependence constraints. These artificial dependences are created by reuse of limited architectural register and memory storage. Such false dependences include write after read (WAR) and write after write (WAW). A WAR occurs when an instruction that writes a new value must wait for all preceding instructions to read the old value. A WAW happens when more than one instruction is written to the same register or memory location. Executing such instructions out of order overwrites the value of the register produced by one instruction before it might have been read by a subsequent one. Therefore, these false data dependences must be eliminated before one can make use of out-of-order and speculative executions.

These dependences and the associated ordering constraints would not occur if a different register name were assigned every time an instruction writes a new value. By applying register renaming operations, each destination architectural (logical) register name is mapped into a unique physical register location in the register file. This, in turn, eliminates all of the false dependences. When an instruction is decoded, its destination logical register number is mapped into a physical register location that is not currently assigned to a logical register. The destination logical register is said to be renamed to the designated physical register. The assigned physical register is therefore removed from the list of free physical registers. All subsequent references to that destination register will point to the same physical register until another instruction that writes to the same logical register is decoded. At that time, the logical register is renamed to a different physical location selected from the free list, and the map is updated to enter the new logical-to-physical mapping.

The physical register of old mappings is returned to the free list to be reused once their values are no longer needed. At the same time, the renaming also provides a mapping table to look up the physical registers assigned to the source logical registers of the instruction. The source operand values are read from these physical locations in the register file. If the free list does not have enough registers, the instruction dispatch is suspended until the needed registers become available. A shadow copy of the register state can also be kept in the register mapper. When an instruction flush occurs, the shadow map is used to restore the register state prior to the flush point so that the machine can resume execution. Thus, it is clear that to facilitate the application of out-of-order and speculative executions to gain machine performance, a register renaming function must be implemented.

One such unit for performing rapid renaming and search is the content-addressable memory (CAM). Such a content-addressable memory (CAM) compares input search data against a table of stored data, and returns the address of the matching data. CAMs have a single clock cycle throughput making them faster than other hardware and software based area search systems. CAMs can be used in a wide variety of applications requiring high search speeds.

However, the speed of a CAM comes at the cost of increased silicon area and power consumption, two design parameters that designers strive to reduce. As CAM applications grow, demanding larger CAM sizes, the power problem is further exacerbated. Reducing size, per chip CAM count, power consumption, without sacrificing processing efficiency, speed, and area is of great need in the industry.

Recent designs have opted to provide larger register rename pools to more aggressively exploit out-of-order execution. As a result the register rename logic has grown in both area and power, constituting a big fraction of resource usage today. Thus, reducing the overall area and power devoted to register renaming without sacrificing performance is of great need in the industry.

SUMMARY OF THE INVENTION

The shortcomings of the prior art are overcome and additional advantages are provided through the provision of a method in a semiconductor of sharing content-addressable memory (CAM) mapper between two distinct physical register files, the method comprising configuring a CAM mapper; and transitioning between a first CAM cell state targeting a first physical register file, wherein by way of the CAM mapper a first functional unit accesses the first physical register file; and a second CAM cell state targeting a second physical register file, wherein by way of the CAM mapper a second functional unit accesses the second physical register file.

System and computer program products corresponding to the above-summarized methods are also described herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which has the capability to point into two different physical register files, but share a rename table, wherein a content-addressable memory (CAM) mapper entry can simultaneously maintain state for two physical register files.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
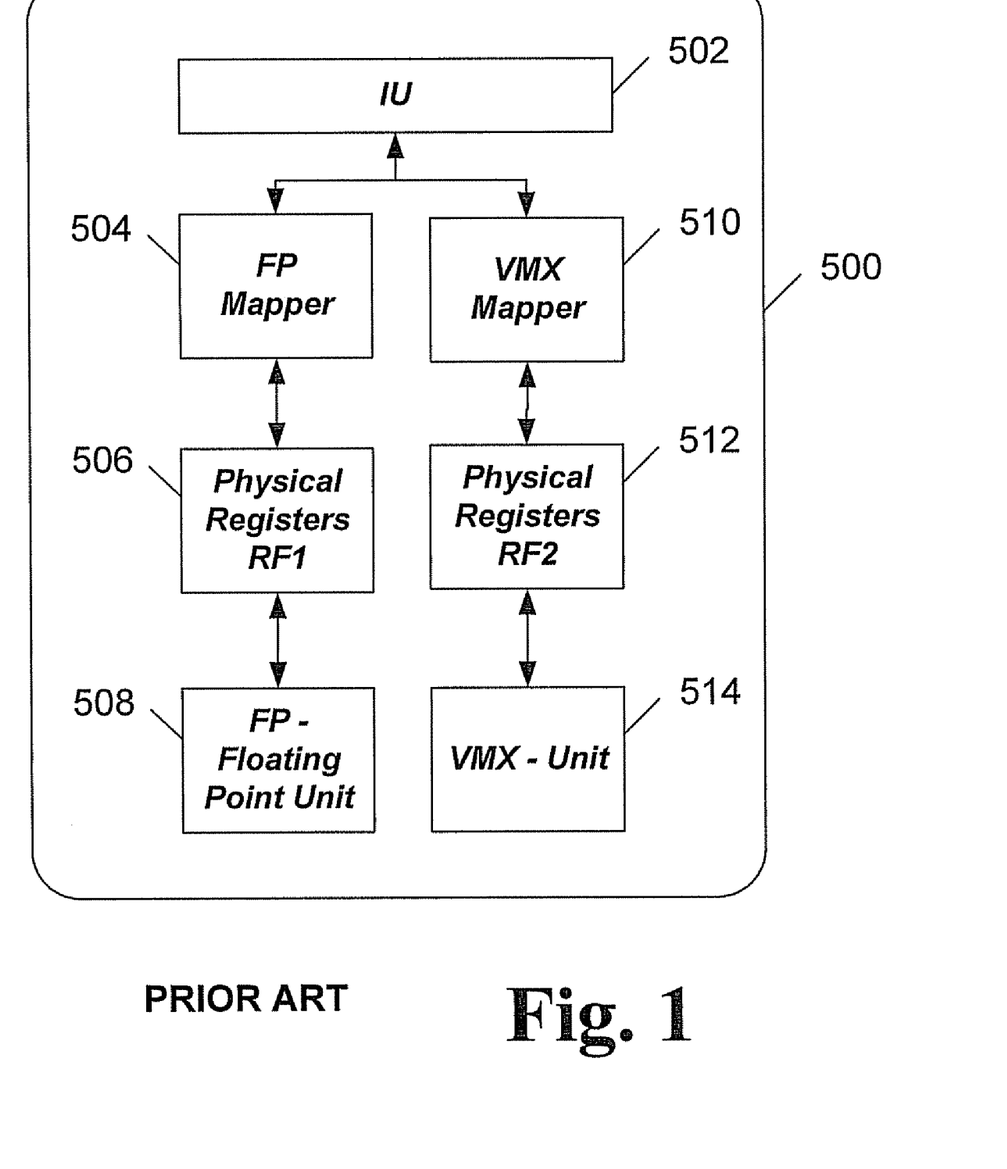
FIG. 1 illustrates one example of a prior art semiconductor system block diagram.

Turning now to the drawings in greater detail, it will be seen that in FIG. 1 there is illustrated one example of a prior art semiconductor system block diagram 500. In this regard, an instruction unit 502 decodes and prepares instructions for execution in either the FPU or vector SIMD (VMX) units. Floating point instructions are renamed by instruction unit 502 utilizing a register mapper 504, also referred to as a FP mapper 504, to access physical register file RF1 506. Floating point instructions are executed by floating point unit FPU 508, reading and writing data from register file RF1 based on the register renaming performed by FP mapper 504. VMX instructions are renamed by instruction unit 502 utilizing a register mapper 510, also referred to as a VMX mapper 510, to access physical register RF2 512. VMX instructions are executed by vector media SIMD unit VMX 514, reading and writing data from register file RF2 based on the register renaming performed by VMX mapper 514. As such, the two mappers 504 and 510 are required in semiconductor 500 and each mapper 504, and 510 is associated with one physical register file 506, and 512 respectively.

Figure 2A:
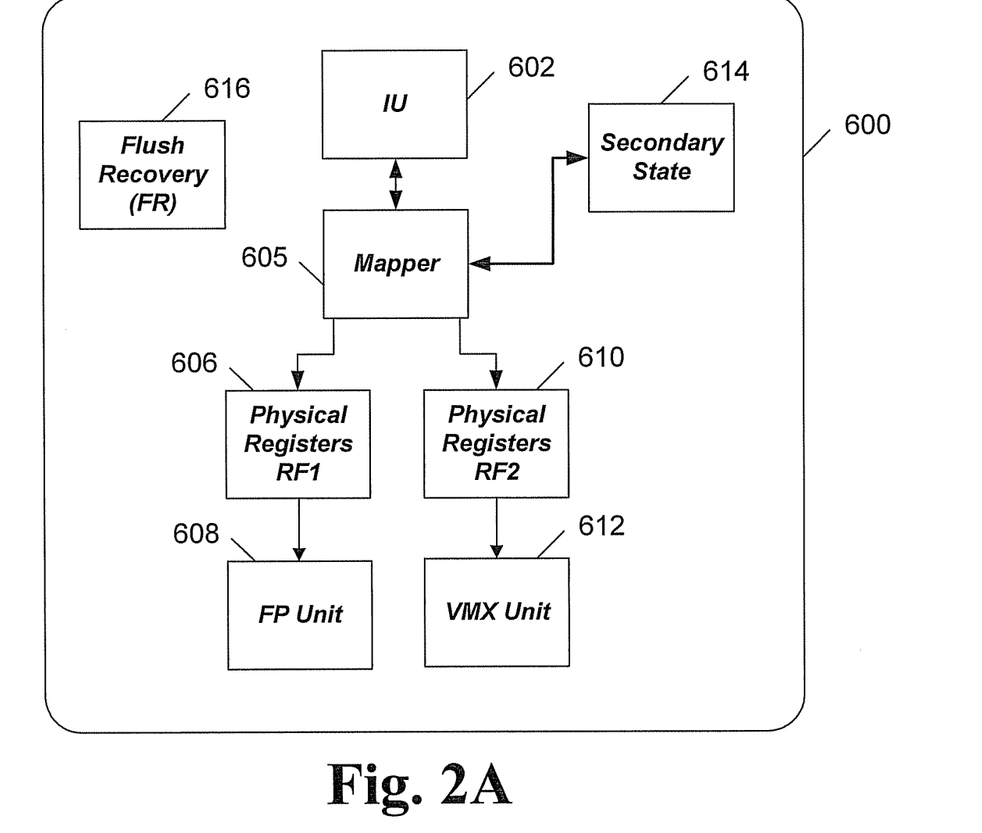
FIG. 2A illustrates one example of a semiconductor with single register rename mapper mapping logical register renames to physical register names in at least two physical register files corresponding to two different architectural units.

In contrast, an embodiment of the invention is illustrated in FIG. 2A. Referring to FIG. 2A there is illustrated one example of an embodiment of a semiconductor 600 with a register rename mapper 605 renaming registers for two physical register files RF1 and RF2. In accordance with this embodiment, the FP and VMX units share one register rename mapper 605, yet both FP and VMX units have their own physical register files.

In this regard, renaming resources can be shared between multiple functional units, in this exemplary embodiment FP and VMX functional units, to reduce the mapper count, which translates into smaller semiconductor size, and reduced power requirement. While in this exemplary embodiment two separate physical register files are maintained one for floating point processing, and one for VMX processing as physical register file RF1 605, and physical register file RF2 610 respectively, the present invention allows these registers to share a single mapper.

To maintain mutually exclusive physical register files 605, and 610 the mapper 605 being of a CAM design can target the correct physical register file by exchanging CAM cell states with a secondary state set 614. In this regard, when floating point instructions are to be performed the CAM cell state can be set such that the destination is physical register file RF1 605, and when VMX instructions are to be performed the CAM cell state can be set such that the destination is physical register file RF2 610.

In order to ensure that the content of the mapper corresponding to the mapping of the floating point architected register file to a first set of physical registers is not lost when the mapping of the VMX architected register is loaded, the floating point mapper state is preserved in secondary state storage 614. Likewise, when the floating point mapper state is loaded to the register mapper, the VMX mapping is stored to secondary state 614.

In another exemplary embodiment a rollback function can be implemented. In this regard, in a shared rollback function only one rollback entry corresponding to the active physical register file 608 or 610 is maintained.

Alternatively, in another exemplary embodiment recovery can be implemented to provide rollback functionality to a first state for a physical register file RF1 608, and a second state for physical register file RF2 610.

In an exemplary embodiment for example and not limitation, the switching effects between FP and VMX units is minimal because the transition can start when FP/VMX is decoded and transferred to the instruction sequencing unit ISU. In addition, the distance between FP/VMX is sufficiently long to hide transition.

In another exemplary embodiment the mapper can further contain states controlling the selective re-execution of instruction in misspeculation events. In a preferred embodiment this information is not replicated by ensuring only one set of instructions is in flight. In an alternative embodiment, information can be allowed to be retained across the state switch and shared between the first and second states. This can also include false sharing. In one embodiment, by masking a set of bits controlling re-execution corresponding to a first unit, when a re-execution event for a second unit occurs. In another alternative embodiment the re-execution state can be duplicated.

Referring to yet another aspect of the exemplary embodiment, those skilled in the art will understand that in one embodiment, floating point processing and vector SIMD processing can be implemented in a single shared execution unit in lieu of separate execution units 608 and 612.

Figure 2B:
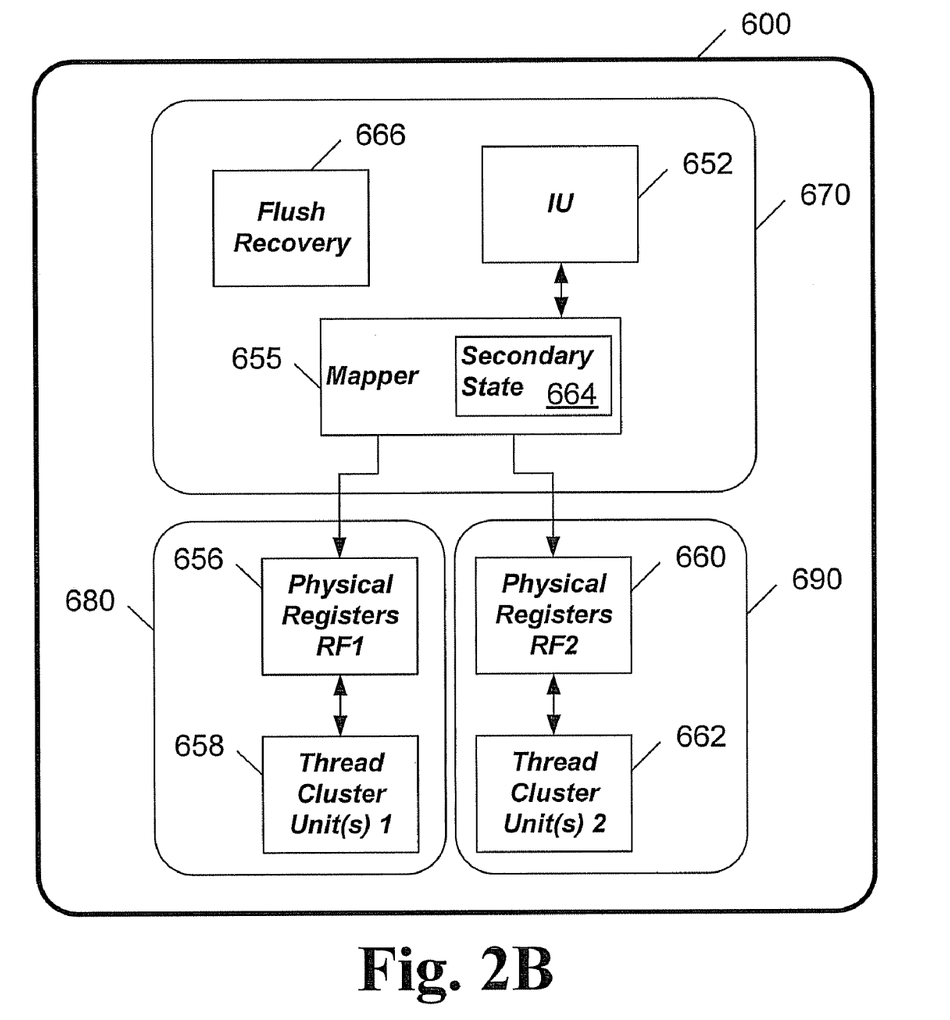
FIG. 2B illustrates one example of a semiconductor with a single register rename mapper mapping logical register renames to physical register names in at least two physical register files corresponding to two thread clusters.

Referring to FIG. 2B there is illustrated another exemplary embodiment of a register map table targeting multiple physical register files used in a threaded execution environment.

In accordance with this exemplary threaded microprocessor, the microprocessor includes a shared front end 670 including a shared mapper, and multiple thread clusters 680 and 690. Each thread cluster is equipped to execute instructions from at least one, hardware thread. To this effect each thread cluster 680 and 690 contains distinct one or more thread cluster execution units 658 and 662, respectively, executing instructions from said one or more threads directed to said execution cluster, and physical register files 656 and 660, respectively, to supply computation operands.

Instructions to the thread clusters are provided from a shared microprocessor front end 670 including an instruction unit 652, a shared mapper 655 including secondary state 664, and flush recovery logic 666.

In accordance with this exemplary embodiment, the mapper unit 655 is shared to provide register renaming for the distinct physical register files RF1 656 and RF 660 corresponding to the two thread units. In accordance with this embodiment, the mapper can provide register renaming to a first set of threads targeting a first thread cluster, and for a second set of threads targeting a second cluster.

When the mapper performs renaming for a first set of threads, the state corresponding to the mapping of the second set of threads is held as secondary state 664. When the mapper performs renaming for a second set of threads, the thread corresponding to the mapping of the first set of threads is held as secondary state 664. In accordance with one exemplary embodiment, the secondary state 664 is tightly integrated in the mapper to reduce the cost of switching between said first and second state as shown in FIG. 2B. In another embodiment, the secondary state is held external to the mapper in accordance with FIG. 2A, In accordance with this embodiment instructions for all threads are decoded and mapped by common front end 670 in accordance with the mapping state for each thread cluster, and at least one of dispatched and issued to the distinct thread clusters, in accordance with the mapping of specific hardware threads to thread clusters.

Semiconductor 600 can contain a plurality of other microprocessor components, system-on-chip (SOC), functional units, logic, and or any other types and kinds of semiconductor feature, functions, software, hardware, etc. without limitations. For disclosure purposes semiconductor 600 is shown in the Figures in a manner to highlight certain aspects of the exemplary embodiments other features of the semiconductor 600 may not be shown. In general a semiconductor 600 can be a microprocessor, IBM microprocessor, IBM POWER4 processor and or other similar types and or kinds of semiconductors and or microprocessors.

Figure 3:
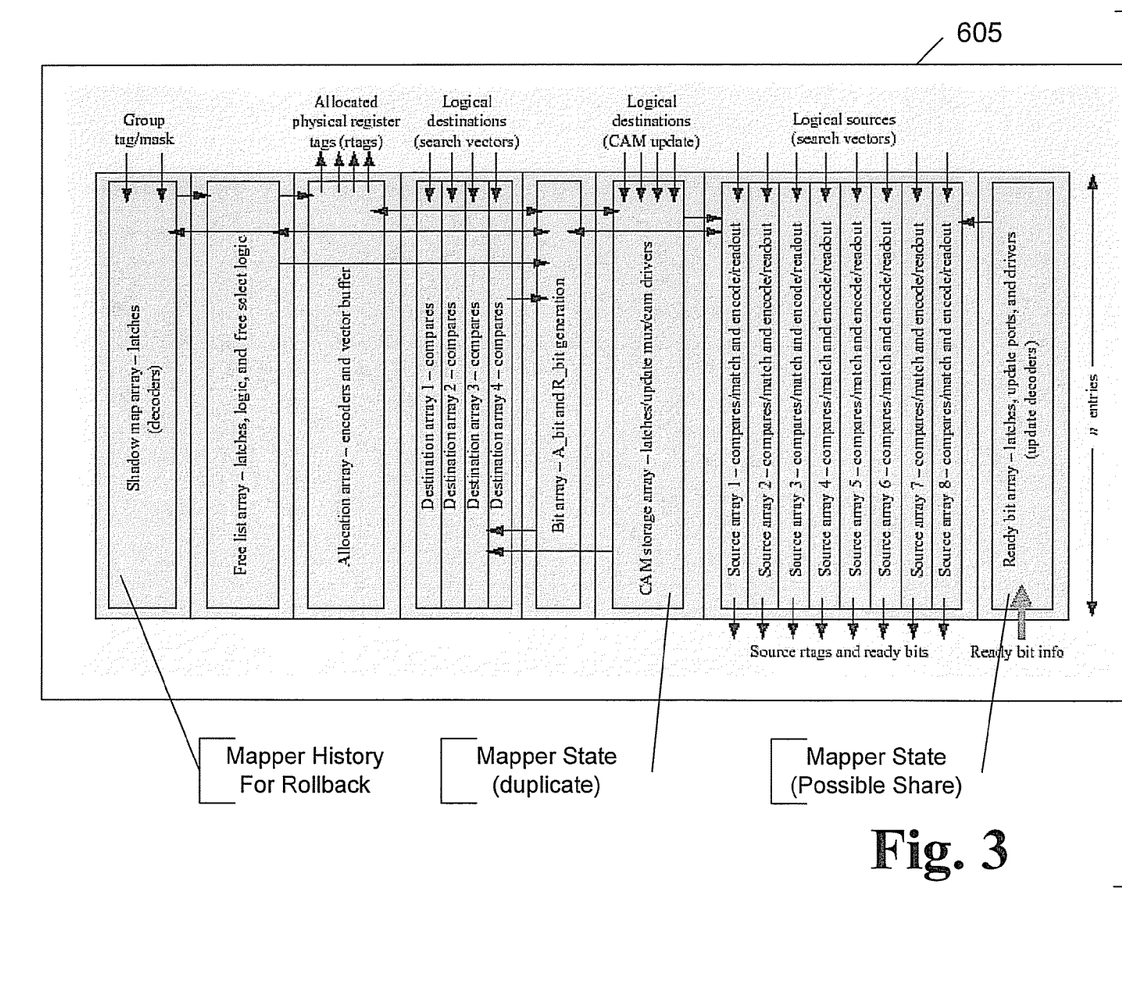
FIG. 3 illustrates one example of a content addressable memory (CAM) system block diagram.

Referring to FIG. 3 there is illustrated one example of a register mapper 605 implemented as a content-addressable-memory (CAM) also referred to as mapper 605. In an exemplary embodiment, the entire mapper 605 is sliced into eight special custom arrays to execute the various functions of the register mapper. The mapper 605 illustrated in FIG. 3 has a set of eight source arrays and four destination arrays. The mapper 605 has a set of 80 physical registers, and the CAM 605 contains a map for a total of 36 logical registers. Therefore, the CAM 605 array has 80 six-bit-wide entries (rows), and each CAM 605 entry stores a six-bit tag of a single logical register. The eight mapper 605 special custom arrays are the following:

1. The CAM 605 storage array contains the CAM register map. Only CAM storage latches, update muxes, and data drivers are kept in this array. The CAM data is driven to source and destination arrays, where the actual comparisons occur. The storage array includes an 'lreg' specifier providing a mapping of each physical register to its most recently assigned logical register.

2. The architected-bit array (bit array) holds bits to indicate an architected state ('A' bit) and a replaced state ('R' bit) of the physical registers. It also contains logic to generate these two bits ('A' and 'R') during instruction dispatch. These bits are used to update the 'A' bit and 'R' bit and are sent to the free list array and shadow array during subsequent cycles. After a flush, this logic also assists in restoring 'A' bits from the shadow maps.

3. The source array contains compare/match logic for looking up (8 to 12) logical source registers in the mapper 605.

4. The destination array contains logic for looking up four logical destination registers in the mapper 605.

5. The free list array holds bits and uses logic to generate and select a set of free registers to be used during the subsequent instruction dispatch.

6. The allocation array allocates new registers.

7. The shadow map array contains the shadow maps that are saved for each group of dispatched instructions.

8. The ready bit array has the latches to hold the ready bit register status information ('W', 'DL0', 'DL1'). The 'DL0' and 'DL1' bits can also be referred to as the delayed load 'DL' bits, or just 'DL' bits.

Noted are areas that in an exemplary embodiment could be used for mapper 605 history used for rollback functionality, and or mapper 605 state functionality.

The operation of a prior art register map unit based on a CAM cell design is described by Buti et al., "Organization and implementation of the register-renaming mapper for out-of-order IBM POWER4 processors", IBM Journal of Research and Development, Volume 49, Issue 1, January 2005 and incorporated herein by reference.

Figure 4:
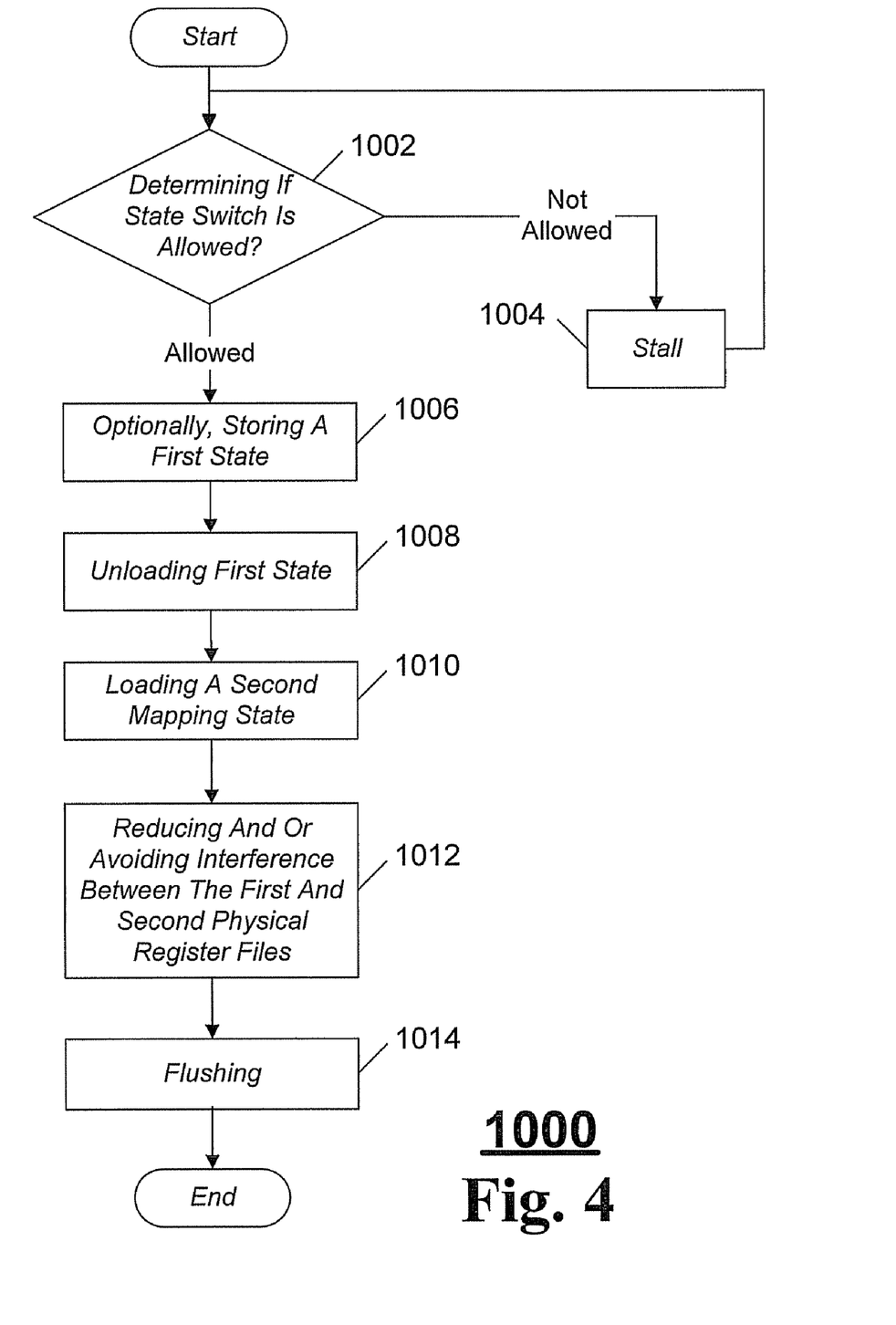
FIG. 4 illustrates one example of a routine to share a CAM mapper between two distinct physical register files.

Referring to FIG. 4 there is illustrated one example of a routine to share a CAM mapper 605 between two distinct physical register files. In an exemplary embodiment when a state switch from a first state to a second state is requested processing in routine 1000 determines if the switch is allowed, if allowed, then causes the CAM cell state to be swapped to cause the mapper 605 to point to the desired physical register file 608, 612, 656, 660. Processing begins in decision block 1002.

In decision block 1002 a determination is made as to whether or not state switching is allowed. If the resultant is in the affirmative that is a state switch is allowed then processing moves to block 1006. If the resultant is in the negative that is state switching is not allowed then processing moves to block 1004.

In block 1004 a brief stall is added to allow processing to complete. Processing then moves back to decision block 1004.

In block 1006 optionally and or as desired and or required settings from the first state are stored. Processing then moves to block 1008.

In block 1008 the first state is unloaded. In an exemplary embodiment this can include the 'lregs', and 'A' bits. Processing then moves to block 1010.

In block 1010 loading of the second state occurs. In an exemplary embodiment, this can include the 'lregs', and 'A' bits. Processing then moves to block 1012.

In block 1012 processing can be performed to reduce and or avoid interference between the first and second physical register files. Processing then moves to block 1014.

In block 1014 flushing of data, and or registers including setting data and or register conditions is performed to finish the state switch. The routine is then exited.

Referring now to decision 1002, in one embodiment of sharing a register mapper, only one type of mapping information is allowed to be maintained in a microprocessor pipeline, to simplify architectural design in terms of design complexity to implement recovery from flushes, and to avoid interference between units sharing a mapper. In such an exemplary embodiment, checking for the ability to initiate a state switch when transitioning from a first mapping state to a second mapping state, will include checking that all instructions corresponding to instructions utilizing said first mapping state have completed.

In another implementation, multiple state mappings can be in flight, if no flush can occur between a point where a first mapping and a state when a second state mapping are active. In one embodiment, this is preserved if the mapping states refer to mapping states of register files within different thread clusters in accordance with FIG. 2B, Referring to FIG. 5 there is illustrated one example of a routine to share a CAM mapper 605 between two distinct physical register files and providing a snapshot of second state before first mapping also referred to as a 'fencepost'. In this regard, providing a fencepost allows a recovery across the switch on a flush condition. Processing begins in decision block 2002.

Figure 5:
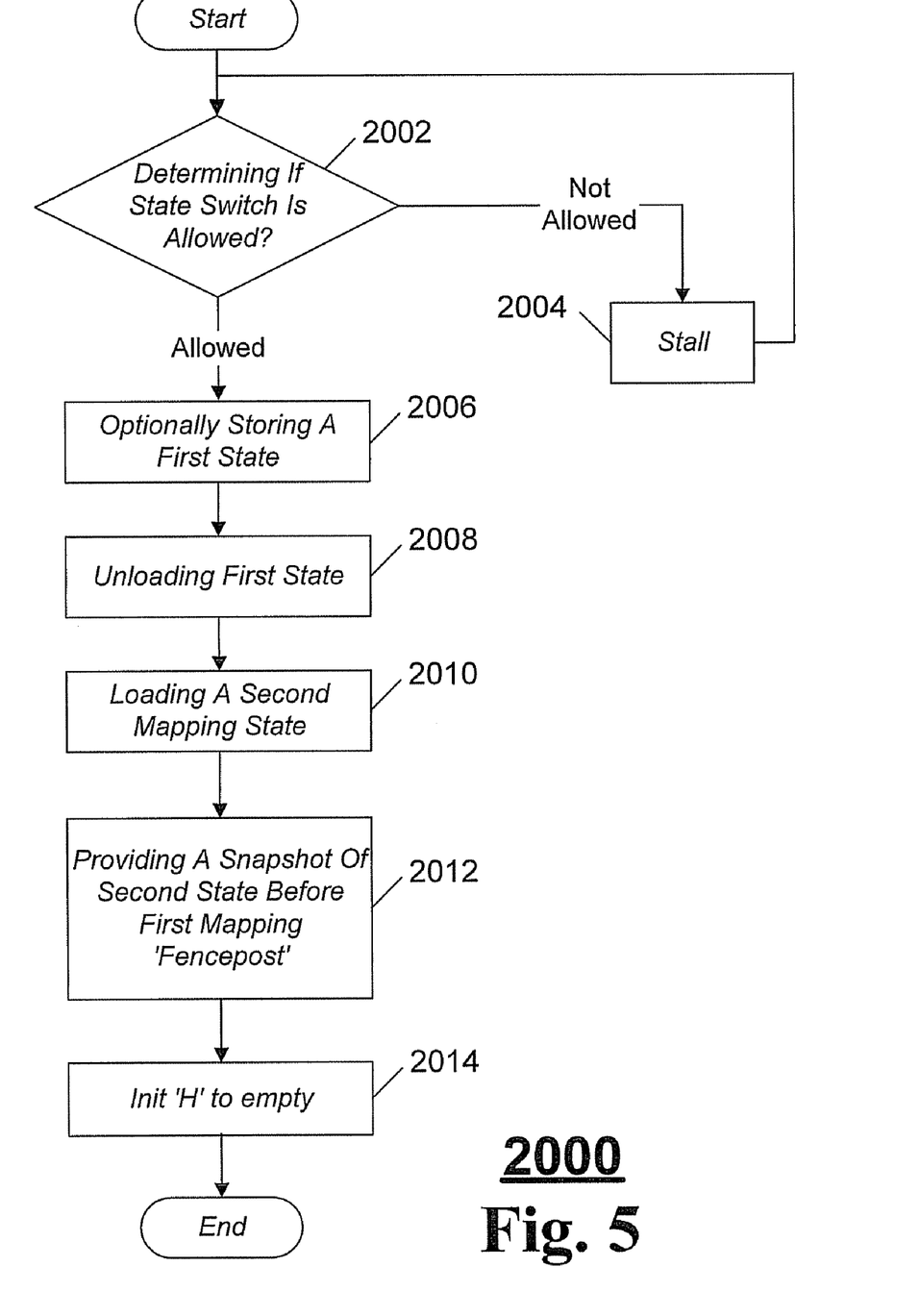
FIG. 5 illustrates one example of a routine to share a CAM mapper between two distinct physical register files and providing a snapshot of second state before first mapping ('fencepost')

In decision block 2002 a determination is made as to whether or not state switching is allowed. If the resultant is in the affirmative that is a state switch is allowed then processing moves to block 2006. If the resultant is in the negative that is state switching is not allowed then processing moves to block 2004.

In block 2004 a brief stall is added to allow processing to complete. Processing then moves back to decision block 2004.

In block 2006 optionally and or as desired and or required settings from the first state are stored. Processing then moves to block 2008.

In block 2008 the first state is unloaded. In an exemplary embodiment, this can include the 'lregs', and 'A' bits. Processing then moves to block 2010.

In block 2010 loading of the second state occurs. In an exemplary embodiment this can include the 'lregs', and 'A' bits. Processing then moves to block 2012.

In block 2012 processing can include providing a snapshot of the second state before first state mapping, also referred to as a 'fencepost'. Processing then moves to block 2014.

In block 1014 'H' is initialized to an empty condition. The routine is then exited.

In accordance with this embodiment, a snapshot corresponding to the second mapper state at the time of the context switch has to be created, allowing to flush back instructions and reset the microprocessor to a state corresponding to the first mapper being active, by recovering the secondary state information for the second map state during the execution of a flush.

In accordance with one embodiment, the number of supported fenceposts snapshots for mappings limits the number of individual mapping transitions which can be present in the microprocessor pipeline at any point in time.

Figure 6:
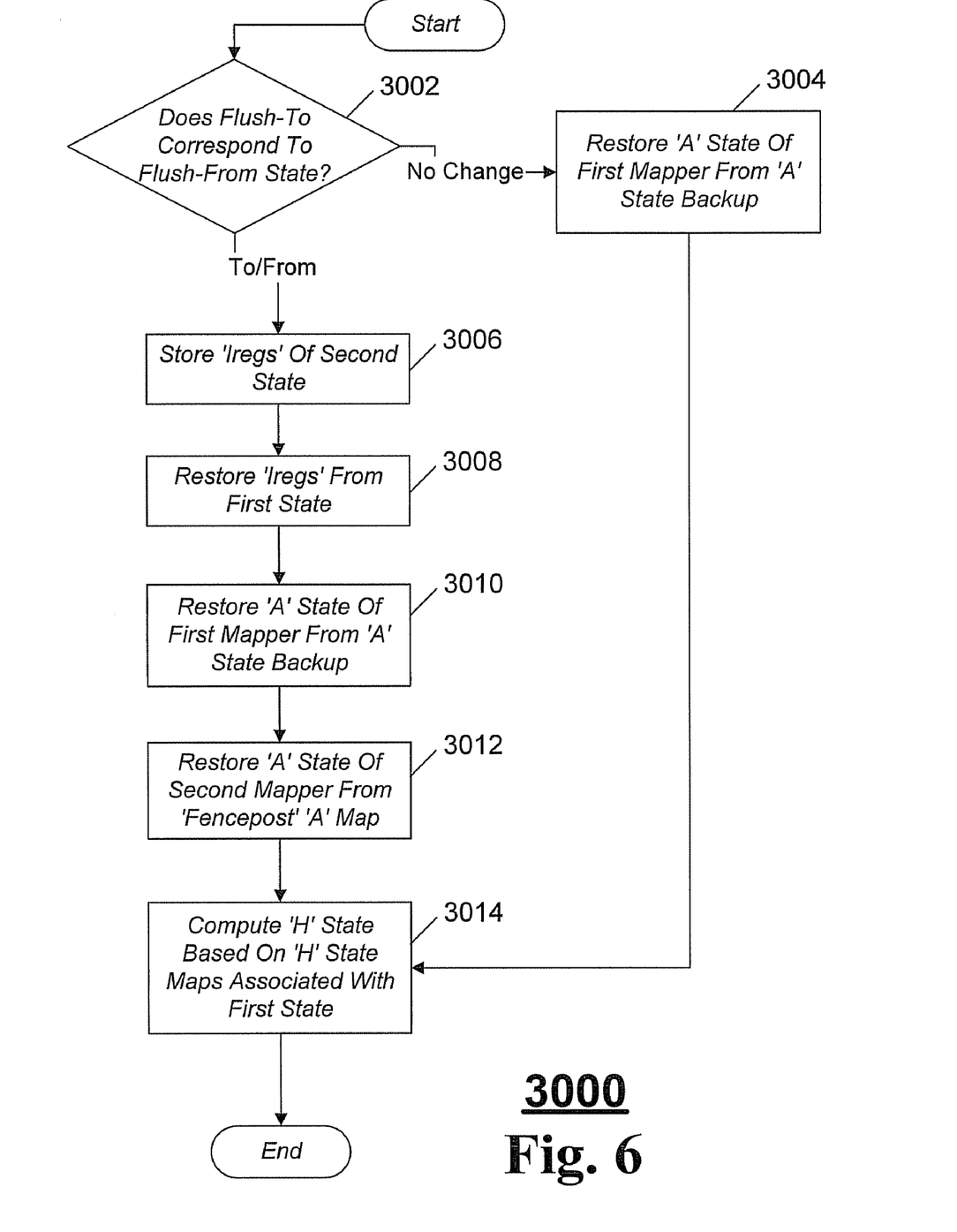
FIG. 6 illustrates one example of a routine to flush during a state change.

Referring to FIG. 6 there is illustrated one example of a method to perform a pipeline flush when said flush changes the active mapping between a first and a second mapping state. In an exemplary embodiment, a test is performed to determine if the flush-to state corresponds to the flush-from state. The flush process sets and or clears the appropriate data, registers, and or flags as part of a state switch. Processing begins in decision block 3002.

In decision block 3002 a determination is made as to whether or not a flush-to state corresponds to the flush-from state. If the resultant is in the affirmative that is the flush-to corresponds to the flush-from state (no change) then processing moves to block 3004. If the resultant is in the negative that is the flush-to does not correspond to the flush-from state then processing moves to block 3006.

If block 3004 processing restores the 'A' state of the shared mapper from 'A' state backup as shown in FIG. 3 and in accordance with prior art. Processing then moves to block 3014.

In block 3006, a flush occurs from a point in the pipeline where a second mapper is active to a state where a first mapper state is active. In block 3006, processing stores 'lreg' of second state to secondary state. Processing then moves to block 3008.

In block 3008 processing restores 'lregs' from first state previously stored in secondary state. Processing then moves to block 3010.

In block 3010 processing restores 'A' state of first mapper from 'A' state backup. Processing then moves to block 3014.

In block 3012 processing restores 'A' state of the second mapper from 'fencepost' 'A' map in the secondary state. Processing then moves to block 3012.

In block 3014 processing computes 'H' state based on 'H' state maps associated with first state. The routine is then exited.

Those skilled in the art will understand that steps 3006 and 3008 have to execute in a manner to allow secondary state and primary state to be exchanged. In one embodiment this is implemented by using concurrent execution of steps 3006 and 3008. In another embodiment, intermediate storage registers are used. In yet another embodiment, the primary and secondary state are contained in similar storage cells, and a simple changing of a selector of the active state accomplished the switching between a first and a secondary state.

In accordance with one embodiment of multiple map table states being supported by a single mapper, a single set of W and DL bits are maintained. This is preferably used when only one set of map states can be concurrently active in a microprocessor design.

In accordance with another embodiment of multiple map table states being supported by a single mapper, multiple sets of W and DL bits are maintained corresponding to the number of map states that can be concurrently active. W and DL bits are then selected appropriately for each mapping operation based on the mapper state.

Figure 7:
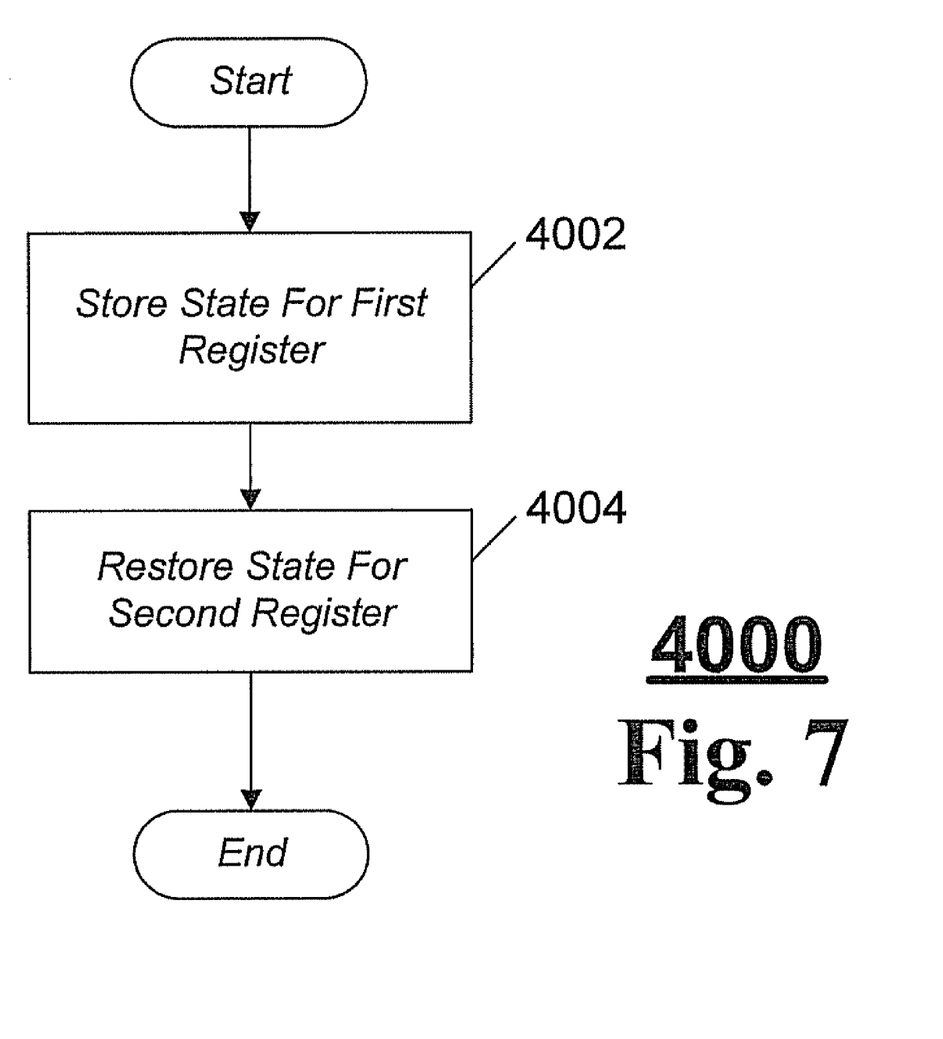
FIG. 7 illustrates one example of a routine for switching between a first and a second state.

Referring to FIG. 7 there is illustrated one example of a routine for switching between a first and a second mapper state. Processing begins in FIG. 7 block 4002.

In block 4002 states for a first register map are stored. Processing then moves to block 4004.

In block 4004 states for second register map are restored. The routine is the exited.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method in a semiconductor of sharing content-addressable memory (CAM) mapper between two distinct physical register files, said method comprising:
   configuring a CAM mapper; and
   transitioning between:
      a first CAM cell state targeting a first physical register file, wherein by way of said CAM mapper a first functional unit accesses said first physical register file; and
      a second CAM cell state targeting a second physical register file, wherein by way of said CAM mapper a second functional unit accesses said second physical register file wherein transitioning comprises unloading and saving the first CAM cell state and loading the second CAM cell state.

2. The method in accordance with claim 1, further comprising:
   starting transition between said first CAM cell state and said second CAM cell state when an instruction is decoded and transferred to an instruction unit, wherein said instruction is an instruction to be processed by said first functional unit or said second functional unit; and
   flushing, setting, and clearing appropriate data, registers, and flags as part of transition between said first CAM cell state and said second CAM cell state.

3. The method in accordance with claim 1, further comprising:
   providing a snapshot of said map state corresponding to mapping logical to physical registers for a first physical register file and said map state corresponding to mapping logical to physical registers for a second physical register file before transitioning between said first CAM cell state and said second CAM cell state.

4. The method in accordance with claim 1, further comprising:
   recovering by way of a rollback function the physical register states of both said first physical register file and said second physical register file from a CAM storage array, said CAM mapper further comprising said CAM storage array; and
   Restoring a secondary state from said snapshot in response a rollback.

5. A semiconductor comprising:
   a first functional unit;
   a second functional unit;
   a first physical register file;
   a second physical register file, said first physical register file is distinct from said second physical register file;
   a content-addressable memory (CAM) mapper, said CAM mapper is operationally related to said first functional unit, said second functional unit, said first physical register file, and said second physical register file, said CAM mapper transitions processing between said first functional unit which utilizes said first physical register file based on a first CAM cell state setting, and said second functional unit which utilizes said second physical register file based on a second CAM cell state setting wherein transitions comprises unloading and saving the first CAM cell state setting and loading the second CAM cell state setting.

6. The semiconductor in accordance with claim 5, wherein said first functional unit is a floating point (FP) unit and said second functional unit is a VMX unit.

7. The semiconductor in accordance with claim 5, wherein said first functional unit corresponds to a functional unit in a first thread cluster, and said second functional unit corresponds to a functional unit in a second thread cluster.

* * * * *